US012576695B2

(12) United States Patent
Cho

(10) Patent No.: US 12,576,695 B2
(45) Date of Patent: Mar. 17, 2026

(54) VEHICLE AIR VENT

(71) Applicant: HYUNDAI MOBIS CO., LTD., Seoul (KR)

(72) Inventor: Young Min Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 380 days.

(21) Appl. No.: 18/387,785

(22) Filed: Nov. 7, 2023

(65) Prior Publication Data

US 2024/0286462 A1    Aug. 29, 2024

(30) Foreign Application Priority Data

Feb. 23, 2023    (KR) ......................... 10-2023-0024181

(51) Int. Cl.
*B60H 1/34*                (2006.01)
(52) U.S. Cl.
CPC ................................. *B60H 1/3421* (2013.01)
(58) Field of Classification Search
CPC ........................... B60H 1/3421; B60H 1/3428
See application file for complete search history.

(56) References Cited

U.S. PATENT DOCUMENTS

2016/0009163 A1*   1/2016   Terai ................... B60H 1/3421
                                                            454/155

FOREIGN PATENT DOCUMENTS

DE          202022102106 U1 *   7/2022   ........... B60H 1/3421

* cited by examiner

*Primary Examiner* — Ngoc T Nguyen
(74) *Attorney, Agent, or Firm* — MORGAN, LEWIS & BOCKIUS LLP

(57)                ABSTRACT

The present invention relates to a vehicle air vent improved to maintain an amount of air passing through the inside of a duct without cutting one region of a main wing. A vehicle air vent includes a duct which accommodates air therein and guides a flow of the air, a front wing rotatable toward a side portion of the duct, a rear wing rotated in a direction intersecting a rotation direction of the front wing, a knob unit coupled to the rear wing to determine rotation directions of the front wing and the rear wing, and a guide unit which is disposed in the duct and rotates the front wing in conjunction with movement of the knob unit, wherein the guide unit includes a rod which has a curved shape along a rotational path of the knob unit and is movable toward the side portion of the duct in conjunction with the movement of the knob unit.

14 Claims, 11 Drawing Sheets

1

[FIG. 1]
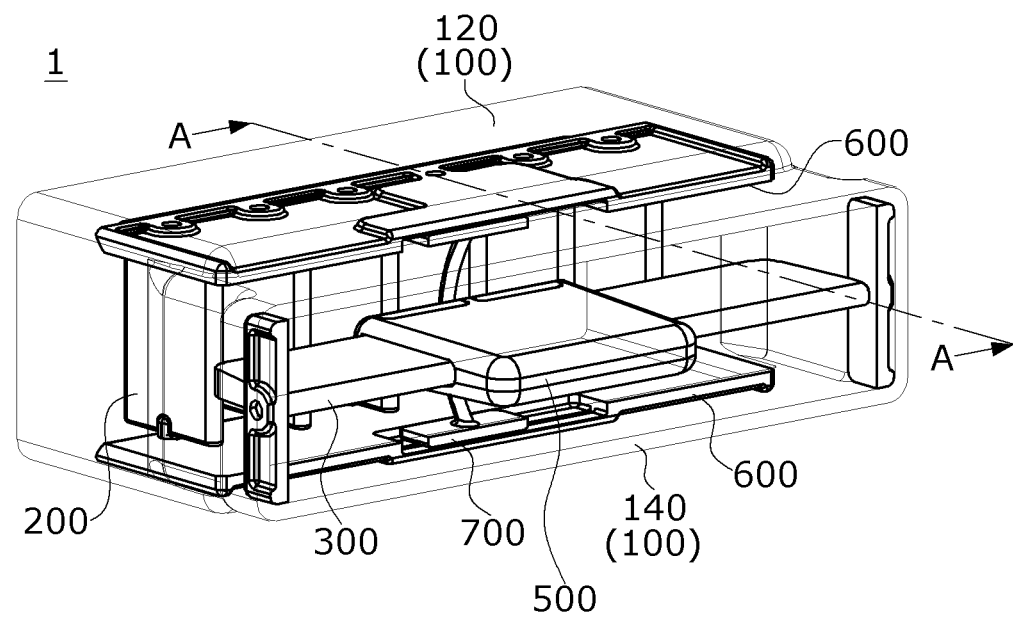

[FIG. 2]
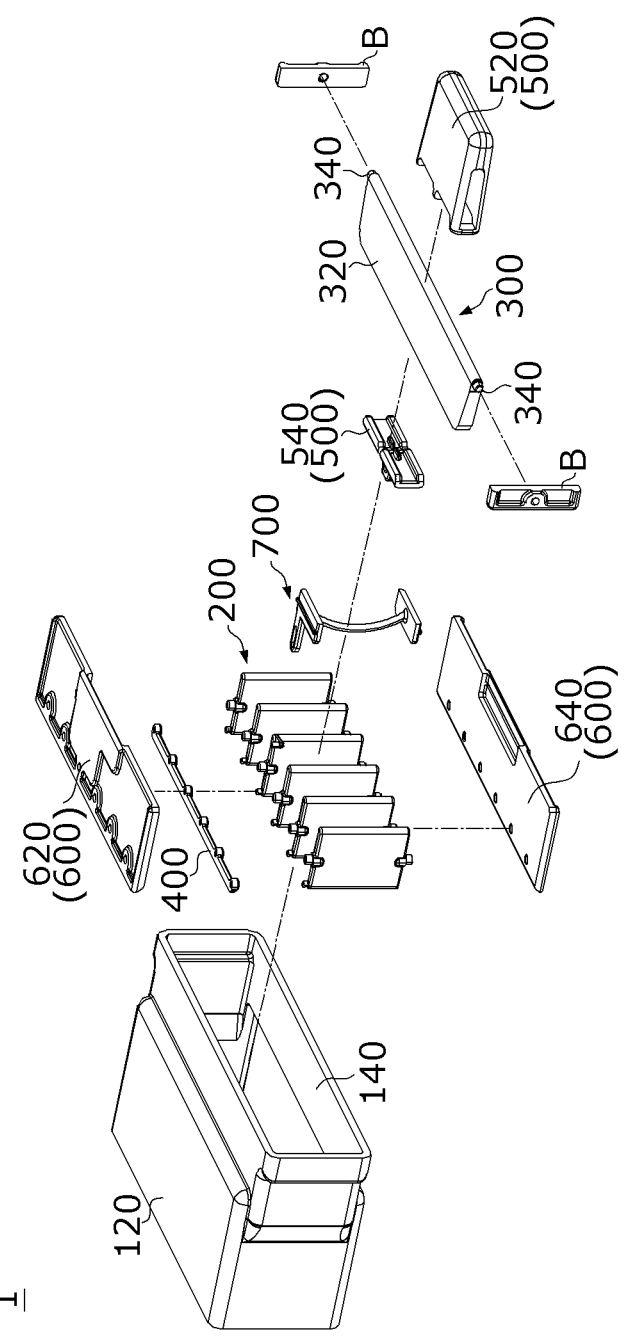

[FIG. 3]
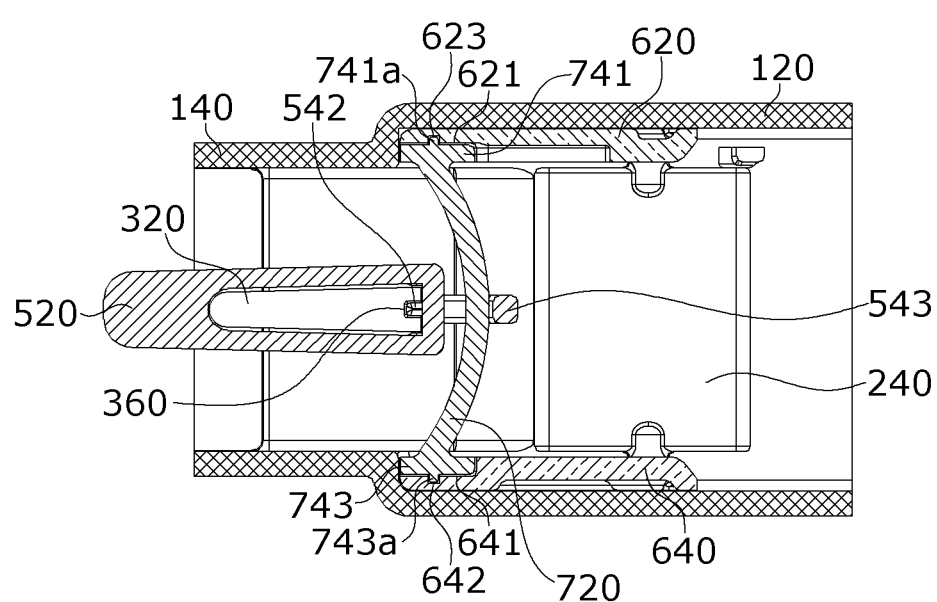

[FIG. 5]
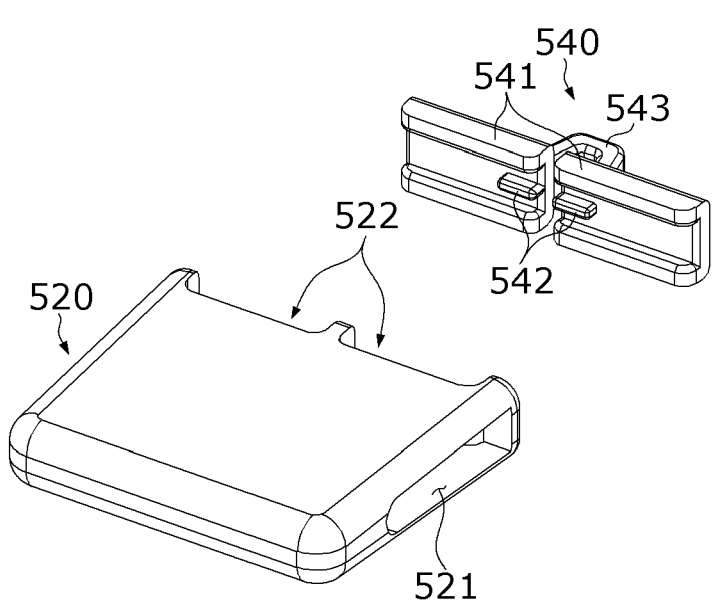

[FIG. 6]
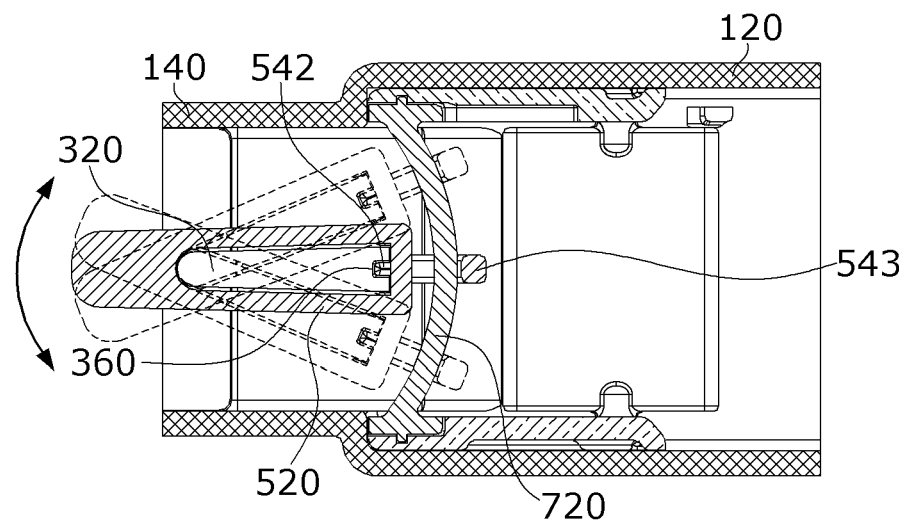

[FIG. 7]
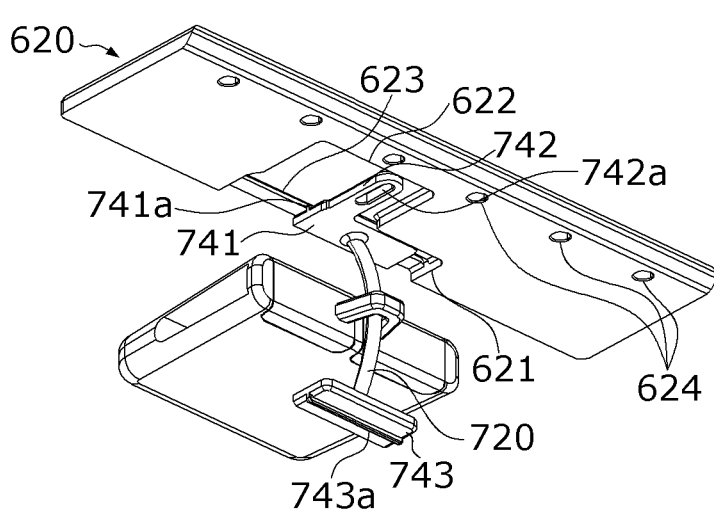

[FIG. 8]
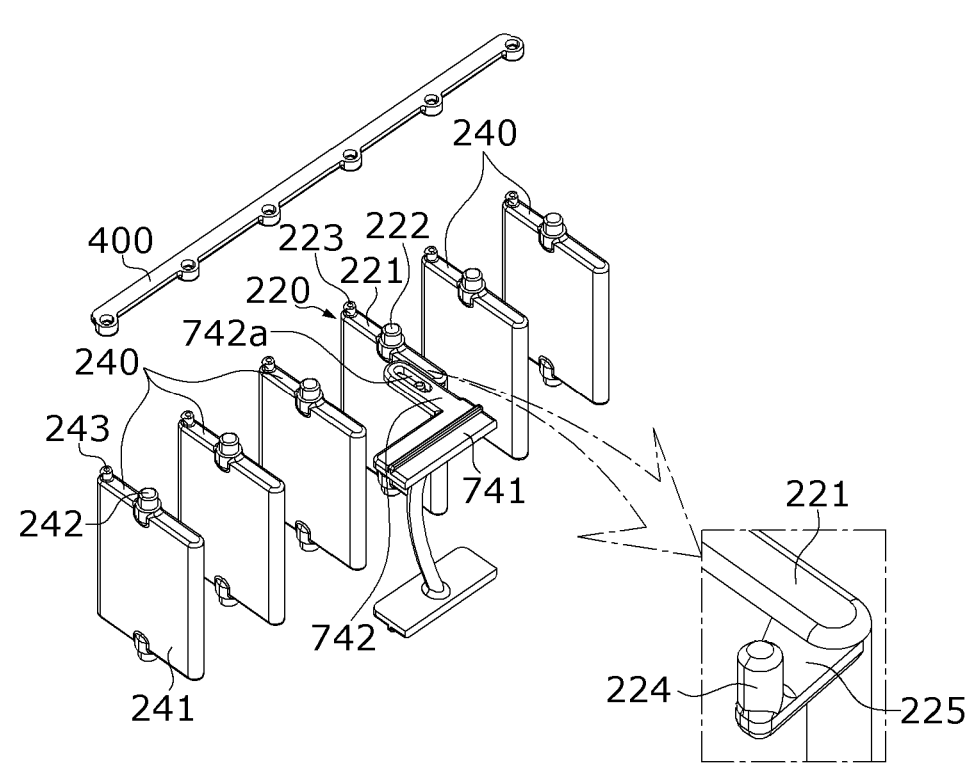

[FIG. 9]
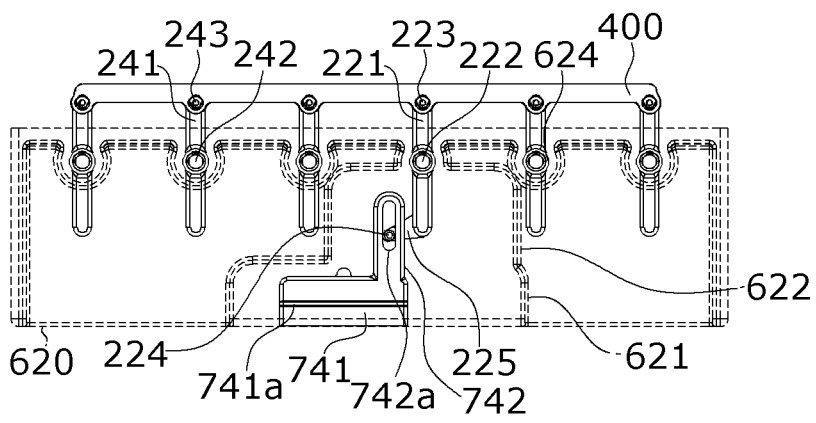

[FIG. 10]
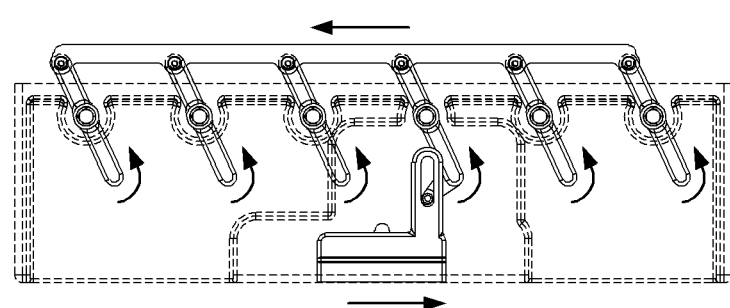

[FIG. 11]
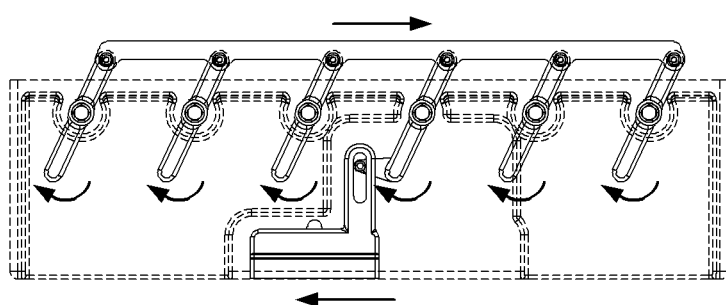

VEHICLE AIR VENT

CROSS-REFERENCE TO RELATED APPLICATION

This application claims priority to and the benefit of Korean Patent Application No. 10-2023-0024181, filed on Feb. 23, 2023, the disclosure of which is incorporated herein by reference in its entirety.

BACKGROUND

Field of the Invention

The present invention relates to a vehicle air vent.

Discussion of Related Art

An air vent may be connected to an air conditioning apparatus to guide air discharged from the air conditioning apparatus to the inside of a vehicle.

The conventional air vent may include a duct through which air passes, a front wing which is disposed in the duct and controls a left-right wind direction, a rear wing which is disposed in a duct housing and controls a vertical wind direction, and a knob unit coupled to the rear wing and manipulated by a user.

Among them, the front wing includes a main wing which is connected to the knob unit and operates in conjunction with the knob unit and a plurality of sub wings disposed at both side portions of the main wing, and the main wing has a shape in which one region is cut in order not to be interfered with by the rotation of the knob unit.

Accordingly, when air is introduced into the duct, the air passing around the main wing may not be properly guided by the main wing and may collide with air passing through the sub wings to cause a vortex phenomenon due to the cut shape of the main wing. Accordingly, there is a problem that loss of an amount of air discharged in a direction set by the knob unit manipulated by the user occurs.

SUMMARY OF THE INVENTION

The present invention is directed to providing a vehicle air vent improved to maintain an amount of air passing through the inside of a duct without cutting one region of a main wing.

According to an aspect of the present invention, there is provided a vehicle air vent including a duct which accommodates air therein and guides a flow of the air, a front wing rotatable toward a side portion of the duct, a rear wing rotated in a direction intersecting a rotation direction of the front wing, a knob unit coupled to the rear wing to determine rotation directions of the front wing and the rear wing, and a guide unit which is disposed in the duct and rotates the front wing in conjunction with movement of the knob unit, wherein the guide unit includes a rod which has a curved shape along a rotational path of the knob unit and is movable toward the side portion of the duct in conjunction with the movement of the knob unit.

The knob unit may include a knob body which is coupled to the rear wing and rotates the rear wing by pressing the rear wing and a connector which connects the knob body and the rod of the guide unit and is slidably coupled to the rear wing.

The guide unit may include moving plates which are disposed on first and second end portions of the rod to be moved with the rod toward the side portion of the duct in conjunction with the movement of the knob unit and a guide plate having a shape protruding from the moving plate and connected to the front wing to rotate the front wing.

The guide plate may include a rail hole of which a length is formed in a direction from the rear wing toward the front wing and which limits a rotation range of the front wing.

The moving plates may include a first moving plate which is disposed on a first end portion of the rod and stops rotation of the connector of the knob unit in one direction and a second moving plate which is disposed on a second end portion of the rod and stops rotation of the connector of the knob unit in the other direction opposite to the one direction.

The vehicle air vent may include a spacer which is disposed in the duct and slidably supports the moving plate, wherein the spacer may include a first spacer which slidably supports the first moving plate and the guide plate and a second spacer which slidably supports the second moving plate.

The first spacer may include a first accommodation groove which accommodates the first moving plate and a second accommodation groove which has a shape extending from the first accommodation groove and accommodates the guide plate.

The front wing may include a first front wing including a moving protrusion movably mounted in the rail hole and a plurality of second front wings disposed at one side and the other side of the first front wing and rotated in the same direction as a direction in which the first front wing is rotated.

The moving protrusion may be guided by the rail hole to move toward or away from the first moving plate when the first moving plate moves toward the side portion of the duct.

The rod may be disposed on a rotation path of the connector of the knob unit.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a perspective view illustrating a vehicle air vent according to one embodiment of the present invention;

FIG. 2 is an exploded perspective view illustrating the vehicle air vent according to one embodiment of the present invention;

FIG. 3 is a cross-sectional view along line A-A of FIG. 1;

FIG. 4 is an exploded perspective view illustrating a knob unit from one direction;

FIG. 5 is an exploded perspective view illustrating the knob unit from another direction;

FIG. 6 is a view illustrating the knob unit and a rear wing which are rotated;

FIG. 7 is a view illustrating a first moving plate coupled to a first plate;

FIG. 8 is a view illustrating a front wing, a guide unit, and a link plate;

FIG. 9 is a view illustrating the front wing which is not rotated;

FIG. 10 is a view illustrating the front wing rotated in one direction; and

FIG. 11 is a view illustrating the front wing rotated in the other direction opposite to the one direction.

DETAILED DESCRIPTION OF EXEMPLARY EMBODIMENTS

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or combination of a plurality of associated listed items.

When a first element is referred to as being "connected" or "coupled" to a second element, it will be understood that the first element may be directly connected or coupled to the second element, or a third element may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under the other element, such a description may include a case in which the one element is formed at an upper side or a lower side with respect to the other element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including" used herein specify the presence of stated features, numbers, steps, operations, elements, and/or components but do not preclude a possibility of the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when a vehicle air vent is described in detail with reference to the accompanying drawings, components that are the same or correspond to each other will be denoted by the same or corresponding reference numerals in all drawings, and redundant descriptions will be omitted.

FIG. 1 is a perspective view illustrating a vehicle air vent according to one embodiment of the present invention, FIG. 2 is an exploded perspective view illustrating the vehicle air vent according to one embodiment of the present invention, and FIG. 3 is a cross-sectional view along line A-A of FIG. 1.

Referring to FIGS. 1 to 3, a vehicle air vent 1 according to one embodiment of the present invention may include a duct 100, a front wing 200, a rear wing 300, a link plate 400, a knob unit 500, a spacer 600, and a guide unit 700.

The duct 100 may guide air conditioned through an air conditioning apparatus (not shown) to be discharged toward a passenger room (not shown). The duct 100 may have a hollow shape so that an inlet hole through which the air is introduced and an outlet hole through which the air is discharged are formed. That is, the duct 100 may accommodate the air therein and guide a flow of the air.

The duct 100 may include an inlet 120 and an outlet 140.

The inlet 120 is connected to the air conditioning apparatus and may guide the air discharged from the air conditioning apparatus into the duct 100. The inlet hole may be disposed in an end portion of the inlet 120.

The outlet 140 may have a shape extending from the end portion of the inlet 120. The outlet 140 may be provided to have a height smaller than a height of the inlet 120 in a direction perpendicular to a direction from the inlet 120 toward the outlet 140. Accordingly, the outlet 140 may have a shape stepped from the inlet 120. The outlet hole may be disposed in an end portion of the outlet 140.

The front wing 200 may be disposed in the inlet 120 of the duct 100. The front wing 200 may be rotatable toward side portions of the duct 100. The front wing 200 may be rotatably coupled to the spacer 600 disposed in the duct 100.

The front wing 200 may include a first front wing 220 and a plurality of second front wings 240.

The first front wing 220 may include a first body 221, first rotary shafts 222, first connecting shafts 223, a moving protrusion 224, and a connecting plate 225.

The first body 221 may rotate toward the side portions of the inlet 120 of the duct 100 about the first rotary shafts 222. Accordingly, the first body 221 may guide air introduced through the inlet 120 of the duct 100 toward a central portion of the duct 100 or both side portions of the duct 100. The first body 221 may have a rectangular shape but is not limited thereto. The first body 221 may be disposed between a first spacer 620 and a second spacer 640 which will be described below.

The first rotary shaft 222 may be disposed at both end portions of the first body 221. The first rotary shaft 222 may have a cylindrical shape protruding from both end portions of the first body 221 toward an inner surface of the inlet 120 of the duct 100. The first rotary shafts 222 may be rotatably supported by the first spacer 620 and the second spacer 640 and rotated in conjunction with the movement of the guide unit 700. The first rotary shaft 222 may be a rotation center of the first body 221.

The first connecting shaft 223 may be disposed at both end portions of the first body 221 on which the first rotary shafts 222 are disposed. The first connecting shafts 223 may be disposed to be spaced apart from the first rotary shafts 222. The first connecting shaft 223 may have a cylindrical shape protruding from both end portions of the first body 221 toward the inner surface of the inlet 120 of the duct 100. The first connecting shafts 223 may be coupled to the link plate 400.

The moving protrusion 224 may be disposed to be spaced apart from the first body 221. When the first rotary shaft 222 is rotated, the moving protrusion 224 may be rotated in the same direction as a direction in which the first body 221 is rotated by the connecting plate 225. The moving protrusion 224 may be movably disposed in a rail hole 742a, which will be described below, of the guide unit 700.

The connecting plate 225 may be disposed between the first body 221 and the moving protrusion 224. The connecting plate 225 may connect the first body 221 and the moving protrusion 224. Accordingly, when the first body 221 is rotated, the moving protrusion 224 may be rotated by the connecting plate 225 in the same direction as a direction in which the first body 221 is rotated.

The plurality of second front wings 240 may be disposed at one side and the other side of the first front wing 220. The plurality of second front wings 240 may be rotated in the same direction as a direction in which the first front wing 220 rotates. The second front wing 240 may include a second body 241, second rotary shafts 242, and second connecting shafts 243.

The second body 241 may have the same shape as the first body 221. The second body 241 may be rotated toward side portions of the inlet 120 of the duct 100 about the second rotary shafts 242. Accordingly, the second body 241 may guide air introduced through the inlet 120 of the duct 100 toward the central portion of the duct 100 or both side portions of the duct 100. The second body 241 may have a rectangular shape but is not limited thereto. The second body 241 may be disposed between the first spacer 620 and the second spacer 640 which will be described below.

The second rotary shaft 242 may be disposed at both end portions of the second body 241. The second rotary shaft 242 may have a cylindrical shape protruding from both end portions of the second body 241 toward the inner surface of the inlet 120 of the duct 100. The second rotary shafts 242 may be rotatably supported by the first spacer 620 and the second spacer 640 and rotated in conjunction with the movement of the guide unit 700. The second rotary shaft 242 may be a rotation center of the second body 241.

The second connecting shaft 243 may be disposed at both end portions of the second body 241 on which the second rotary shafts 242 are disposed. The second connecting shafts 243 may be disposed to be spaced apart from the second rotary shafts 242. The second connecting shaft 243 may have a cylindrical shape protruding from both end portions of the second body 241 toward the inner surface of the inlet 120 of the duct 100.

The second connecting shaft 243 may be coupled to the link plate 400. Accordingly, when the link plate 400 is moved by the first connecting shaft 223 of the first front wing 220, the second connecting shaft 243 is moved by the link plate 400, and the second body 241 is guided by the second connecting shaft 243 and rotated about the second rotary shaft 242.

The rear wing 300 may be disposed in the outlet 140 of the duct 100. The rear wing 300 may be coupled to the knob unit 500, and the rear wing 300 may be rotated in conjunction with the movement of the knob unit 500. The rear wing 300 may be rotated in a direction intersecting a rotation direction of the front wing 200. The rear wing 300 may include a third body 320, third rotary shafts 340, and a first slide groove 360.

The third body 320 may have a rectangular shape extending in a longitudinal direction of the duct 100. The third body 320 may support the knob unit 500. The third body 320 may be rotated in the outlet 140 of the duct 100 to guide air introduced into the duct 100 to move toward a ceiling surface of a passenger room or a bottom surface of the passenger room.

The third rotary shaft 340 may be disposed at both end portions of the third body 320. When the third body 320 is disposed in the outlet 140 of the duct 100, the third rotary shafts 340 may be disposed between the third body 320 and the outlet 140 of the duct 100. The third rotary shafts 340 may be rotatably supported by support blocks B disposed in the outlet 140. When the knob unit 500 is rotated, the third rotary shafts 340 may be rotated in the same direction as a direction in which the third body 320 is rotated. The third rotary shaft 340 may be a rotation center of the third body 320.

The first slide groove 360 may be disposed in the third body 320. More specifically, the first slide groove 360 may be formed in a surface of the third body 320 coupled to a connector 540, which will be described below, of the knob unit 500. The first slide groove 360 may slidably support first slide protrusions 542, which will be described below, of the knob unit 500. That is, the first slide groove 360 may guide a moving direction of the knob unit 500.

The link plate 400 may connect the first front wing 220 and the plurality of second front wings 240. The link plate 400 may be disposed in the inlet 120 of the duct 100 while the first front wing 220 and the plurality of second front wings 240 are connected.

The link plate 400 may be coupled to the first connecting shaft 223 of the first front wing 220 and the second connecting shaft 243 of the second front wing 240 to rotate the second front wing 240 in conjunction with rotation of the first front wing 220. The link plate 400 may be moved in a direction opposite to a moving direction of moving plates 740 of the guide unit 700 which will be described below.

Figure 4:
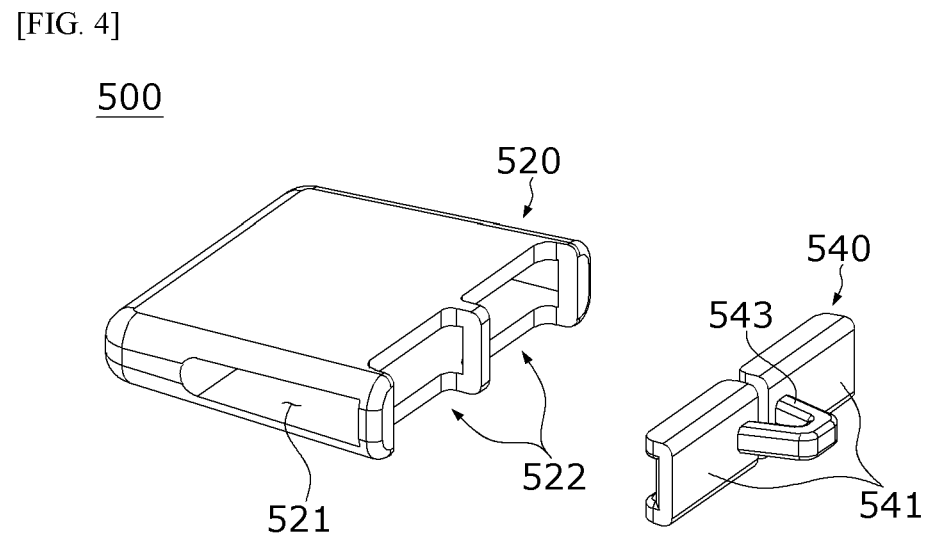

FIG. 4 is an exploded perspective view illustrating the knob unit from one direction, FIG. 5 is an exploded perspective view illustrating the knob unit from another direction, and FIG. 6 is a view illustrating the knob unit and the rear wing which are rotated.

Referring to FIGS. 1 to 6, the knob unit 500 may be coupled to the rear wing 300. The knob unit 500 may be disposed in the outlet 140 of the duct 100 while coupled to the rear wing 300. The knob unit 500 may determine the rotation direction of the front wing 200 and the rear wing 300. The knob unit 500 may include a knob body 520 and the connector 540.

The knob body 520 may be coupled to the rear wing 300. The knob body 520 may rotate the rear wing 300 by pressing the rear wing 300 through a user's manipulation. The knob body 520 may surround one region of the rear wing 300. The knob body 520 may include a through hole 521 and concave portions 522.

The through hole 521 may be formed to pass through the knob body 520 in a longitudinal direction of the third body 320 of the rear wing 300 coupled to the knob body 520. The through hole 521 may accommodate one region of the third body 320 of the rear wing 300. Due to the through hole 521, the knob body 520 may be moved on the third body 320 of the rear wing 300 toward both side portions of the duct 100.

Each of the concave portions 522 may be formed in a surface of the knob body 520 coupled to the connector 540. The concave portion 522 may have a shape in which the surface of the knob body 520 coupled to the connector 540 is recessed inward of the knob body 520. A plurality of concave portions 522 may be disposed. The concave portions 522 may be connected to the through hole 521. The concave portions 522 may accommodate coupling blocks 541, which will be described below, of the connector 540.

The connector 540 may be coupled to the knob body 520. The connector 540 may connect the knob body 520 and a rod 720, which will be described below, of the guide unit 700. The connector 540 may be slidably coupled to the rear wing 300. The connector 540 may include the coupling blocks 541, first slide protrusions 542 and a hook 543.

The coupling blocks 541 may be coupled to the knob body 520. More specifically, the coupling blocks 541 may be disposed in the concave portions 522 of the knob body 520.

A plurality of coupling blocks 541 may be provided along the plurality of concave portions 522. The coupling blocks 541 may support the first slide protrusions 542. The coupling blocks 541 disposed on the concave portions 522 may be collinear with the surface of the knob body 520 in which the concave portions 522 are disposed. Accordingly, a coupling structure of the coupling blocks 541 and the concave portions 522 may have an effect of preventing a phenomenon in which the coupling blocks 541 may collide with the rod 720, which will be described below, of the guide unit 700 in advance. Accordingly, the user's manipulation stability of the knob unit 500 can be improved.

The first slide protrusions 542 may be disposed on the plurality of coupling blocks 541. More specifically, the first slide protrusions 542 may be disposed on inner surfaces of the coupling blocks 541. As illustrated in FIGS. 5 and 6, the first slide protrusions 542 may be slidably disposed in the first slide groove 360 of the rear wing 300. The first slide protrusions 542 may move in the first slide groove 360 to move the coupling blocks 541 operating in conjunction with the movement of the knob body 520 in the same direction as a movement direction of the knob body 520.

The hook 543 may connect the coupling blocks 541. The hook 543 may be movably coupled to the rod 720, which will be described below, of the guide unit 700 in a state in which the coupling blocks 541 are connected by the hook 543. The hook 543 may surround the rod 720 in a state in which the coupling blocks 541 are disposed in the concave portions 522 of the knob body 520. The hook 543 may be rotated according the coupling blocks 541 rotated according to the knob body 520.

FIG. 7 is a view illustrating a first moving plate coupled to a first plate, FIG. 8 is a view illustrating the front wing, the guide unit, and the link plate, and FIG. 9 is a view illustrating the front wing which is not rotated.

Referring to FIGS. 3, 4, and 6 to 9, the spacer 600 may be disposed in the duct 100, more specifically, in the inlet 120 of the duct 100. The spacer 600 may movably support the moving plates 740 which will be described below. The spacer 600 may include a first spacer 620 and a second spacer 640.

The first spacer 620 may be disposed on an upper inner surface of the inlet 120 of the duct 100 based on FIG. 3. The first spacer 620 may slidably support a first moving plate 741 and a guide plate 742 which will be described below. The first spacer 620 may include a first accommodation groove 621, a second accommodation groove 622, a second slide groove 623, and third accommodation grooves 624.

The first accommodation groove 621 may be formed in a surface of the first spacer 620 facing the first moving plate 741 of the guide unit 700 which will be described below. A depth of the first accommodation groove 621 may be the same as a thickness of the first moving plate 741 but is not limited thereto. The first accommodation groove 621 may accommodate the first moving plate 741. A length of the first accommodation groove 621 may be greater than a length of the first moving plate 741. Accordingly, the first moving plate 741 may move toward both side portions of the first spacer 620 in the first accommodation groove 621.

The second accommodation groove 622 may be formed in the surface of the first spacer 620 facing the first moving plate 741, which will be described below, of the guide unit 700. The second accommodation groove 622 may have a shape extending from the first accommodation groove 621. The second accommodation groove 622 may accommodate the guide plate 742 which will be described below. A length of the second accommodation groove 622 may be smaller than the length of the first accommodation groove 621. Accordingly, as illustrated in FIG. 7, one surface of the first spacer 620 constituting the second accommodation groove 622 may serve as a stopper to stop the movement of the guide plate 742.

The second slide groove 623 may be disposed in the first accommodation groove 621. More specifically, the second slide groove 623 may have a shape concave inward of the first spacer 620 from one surface of the first spacer 620 constituting the first accommodation groove 621 in a direction in which the first accommodation groove 621 is formed. When the first moving plate 741, which will be described below, of the guide unit 700 is coupled to the second slide groove 623, the second slide groove 623 may slidably support a second slide protrusion 741$a$. A length of the second slide groove 623 may be the same as the length of the first accommodation groove 621 but is not limited thereto.

The third accommodation grooves 624 may be formed in the surface in which the first accommodation groove 621 or the second accommodation groove 622 is formed in the first spacer 620 in a longitudinal direction of the first spacer 620. A plurality of third accommodation grooves 624 may be provided. The third accommodation grooves 624 may support the first rotary shaft 222 of the first front wing 220 and the second rotary shafts 242 of the second front wings 240.

The second spacer 640 may be disposed on a lower inner surface of the inlet 120 of the duct 100 based on FIG. 3. The second spacer 640 may slidably support a second moving plate 743 which will be described below. The second spacer 640 may include a fourth accommodation groove 641, a third slide groove 642, and fifth accommodation grooves 643.

As illustrated in FIGS. 2 and 3, the fourth accommodation groove 641 may be formed in a surface of the second spacer 640 facing the second moving plate 743 of the guide unit 700 which will be described below. A depth of the fourth accommodation groove 641 may be the same as a thickness of the second moving plate 743 but is not limited thereto. The fourth accommodation groove 641 may accommodate the second moving plate 743. A length of the fourth accommodation groove 641 may be greater than a length of the second moving plate 743. Accordingly, the second moving plate 743 may be moved in the fourth accommodation groove 641 toward both side portions of the second spacer 640.

The third slide groove 642 may be disposed in the fourth accommodation groove 641. More specifically, the third slide groove 642 may have a shape concave inward of the second spacer 640 from one surface of the second spacer 640 constituting the fourth accommodation groove 641 in a direction in which the fourth accommodation groove 641 is formed. When the second moving plate 743, which will be described below, of the guide unit 700 is coupled to the third slide groove 642, the third slide groove 642 may slidably support a third slide protrusion 743$a$. A length of the third slide groove 642 may be the same as the length of the fourth accommodation groove 641 but is not limited thereto.

The fifth accommodation groove 643 may be formed in the surface of the second spacer 640 in which the fourth accommodation groove 641 is formed in a longitudinal direction of the second spacer 640. A plurality of fifth accommodation grooves 643 may be provided. The fifth accommodation grooves 643 may support the first rotary shaft 222 of the first front wing 220 and the second rotary shafts 242 of the second front wings 240.

The guide unit 700 may be disposed in the duct 100. More specifically, the guide unit 700 may be disposed in the inlet 120 of the duct 100. The guide unit 700 may be provided separately from the front wing 200. The guide unit 700 may rotate the front wing 200 in conjunction with the movement of the knob unit 500. The guide unit 700 may include the rod 720 and the moving plates 740.

The rod 720 may be provided in a curved shape. More specifically, the rod 720 may have the curved shape along a rotation path of the knob unit 500. Accordingly, the rod 720 may be disposed on a rotation path of the hook 543 of the connector 540 of the knob unit 500. This may mean that a lifetime of the hook 543 may be maintained by preventing collision with the rod 720 when the hook 543 is rotated. As illustrated in FIGS. 3 and 6, the rod 720 may be disposed between the knob body 520 of the knob unit 500 and the front wing 200.

The rod 720 may move toward the side portions of the duct 100 in conjunction with the movement of the knob unit 500. That is, since the rod 720 according to the present embodiment is provided separately from the front wing 200, moving freedom may be provided as compared to the rod 720 of the conventional air vent integrally coupled to the front wing 200. In addition, since the rod 720 according to the present embodiment is provided separately from the front wing 200, the cutting of one region of the front wing 200 in order to arrange the connector 540 coupled to the conventional rod 720 in the front wing 200 may not be needed. Accordingly, compared to the conventional air vent in which the front wing 200 and the rod 720 are integrally provided, the vehicle air vent 1 according to the present embodiment can prevent loss of air volume by maintaining the air guide performance of the first front wing 220 coupled to the guide unit 700.

In addition, since the rod 720 according to the present embodiment is provided separately from the front wing 200, a phenomenon in which the conventional connector 540 rotates in a direction toward both side portions of the duct 100 and is interfered with by the front wing 200 may be prevented. Accordingly, a region disposed between the front wing 200 and the rod 720 in the connector 540 may have a thickness which does not interfere with by the front wing 200, does not disturb air movement, and is not damaged by vibrations caused by an external force.

The moving plates 740 may be disposed on both end portions of the rod 720. The moving plates 740 may move toward the side portions of the duct 100 together with the rod 720 in conjunction with the movement of the knob unit 500. The moving plates 740 may include the first moving plate 741 and the second moving plate 743.

The first moving plate 741 may be disposed on one end portion of the rod 720. As illustrated in FIG. 3, the first moving plate 741 may be accommodated in the first accommodation groove 621 of the first spacer 620. The first moving plate 741 may stop the rotation of the connector 540 of the knob unit 500 in one direction.

The first moving plate 741 may include the second slide protrusion 741a. The second slide protrusion 741a may be formed to protrude from a surface of the first moving plate 741 facing the first spacer 620. The second slide protrusion 741a may be slidably disposed in the second slide groove 623 of the first spacer 620. When the connector 540 is moved along the knob body 520 of the knob unit 500, the second slide protrusion 741a may be pressed by the connector 540 and moved in the same direction as a direction in which the connector 540 is moved.

The second moving plate 743 may be disposed on the other end portion of the rod 720. As illustrated in FIG. 3, the second moving plate 743 may be accommodated in the fourth accommodation groove 641 of the second spacer 640. The second moving plate 743 may stop the rotation of the connector 540 of the knob unit 500 in the other direction opposite to one direction.

The second moving plate 743 may include the third slide protrusion 743a. The third slide protrusion 743a may be formed to protrude from a surface of the second moving plate 743 facing the second spacer 640. The third slide protrusion 743a may be slidably disposed in the third slide groove 642 of the second spacer 640. When the connector 540 is moved according to the knob body 520 of the knob unit 500, the third slide protrusion 743a may be pressed by the connector 540 and moved in the same direction as a direction in which the connector 540 is moved.

As illustrated in FIGS. 7 to 9, the guide plate 742 may have a shape protruding from the moving plate 740. More specifically, the guide plate 742 may have the shape protruding from the first moving plate 741. The guide plate 742 may be connected to the first front wing 220 of the front wing 200 to rotate the front wing 200. The guide plate 742 may include the rail hole 742a.

The rail hole 742a may be provided in a shape having a length formed in a direction from the rear wing 300 toward the front wing 200. The rail hole 742a may movably accommodate the moving protrusion 224 of the first front wing 220.

FIG. 10 is a view illustrating the front wing rotated in one direction, and FIG. 11 is a view illustrating the front wing rotated in the other direction opposite to the one direction.

Referring to FIGS. 9 to 11, the rail hole 742a may limit a rotation range of the front wing 200.

More specifically, when the first moving plate 741 moves toward the side portions of the duct 100, the moving protrusion 224 is guided by the rail hole 742a to move toward or away from the first moving plate 741.

More specifically, first, when the first moving plate 741 is moved rightward based on FIGS. 9 and 10, the moving protrusion 224 of the first front wing 220 may be guided by the rail hole 742a and disposed at a lower side the rail hole 742a. The first front wing 220 and the plurality of second front wings 240 are rotated counterclockwise based on FIG. 10. In this case, since the moving protrusion 224 is disposed at the lower side of the rail hole 742a, the rotation of the first front wing 220 and the plurality of second front wings 240 may be stopped.

Conversely, based on FIGS. 9 and 11, when the second moving plate 743 is moved rightward, the moving protrusion 224 of the first front wing 220 may be guided by the rail hole 742a and disposed at an upper side of the rail hole 742a. The first front wing 220 and the plurality of second front wings 240 are rotated clockwise based on FIG. 11. In this case, since the moving protrusion 224 is disposed at the upper side of the rail hole 742a, the rotation of the first front wing 220 and the plurality of second front wings 240 may be stopped.

As described above, the rail hole 742a may guide the moving protrusion 224 and limit a moving range of the moving protrusion 224 to prevent excessive rotation of the front wing 200. Accordingly, the rail hole 742a can prevent a phenomenon, in which the front wing 200 comes into contact with the side portions of the duct 100 and is damaged, to maintain the air guide performance of the front wing 200 and prevent loss of air volume.

As described above, in the vehicle air vent 1 according to one embodiment of the present invention, the cutting of the front wing 200 which guides air passing through the inside of the duct 100, more specifically, the first front wing 220 may not be needed due to the rod 720 provided separately from the front wing 200. Accordingly, the air guide performance of the vehicle air vent 1 can be improved compared to the conventional air vent.

In addition, in the vehicle air vent 1 according to one embodiment of the present invention, since the cutting of the first front wing 220 is not needed, a phenomenon in which air guided by the second front wing 240 collides with air guided by the first front wing 220 can be prevented. Accordingly, generation of a vortex due to the collision of the air moving in the duct 100 can be prevented, and thus a decrease in air volume can be prevented.

According to one embodiment of the present invention, since a rod is provided separately from a first front wing to maintain a shape of the first front wing, the air guide performance of the first front wing can be maintained.

In addition, according to one embodiment of the present invention, since a rod is provided separately from a first front wing and a connector does not interfere with by the first front wing, air loss due to a shape of the connector can be reduced.

While the present invention has been described above with reference to embodiment of the present invention, it may be understood by those skilled in the art that various modifications and changes of the present invention may be made within a range not departing from the spirit and scope of the present invention defined by the appended claims. In addition, it should be interpreted that differences related to the modifications and changes fall within the scope of the present invention defined by the appended claims.

What is claimed is:

1. A vehicle air vent comprising:
a duct which accommodates air therein and guides a flow of the air therethrough;
a front wing rotatable toward a side portion of the duct;
a rear wing rotated in a direction intersecting a rotation direction of the front wing;
a knob unit coupled to the rear wing to determine the rotation direction of the front wing and a rotation direction of the rear wing; and
a guide unit which is disposed in the duct and rotates the front wing in conjunction with movement of the knob unit,
wherein the guide unit includes a rod which has a curved shape along a rotational path of the knob unit and is movable toward the side portion of the duct in conjunction with the movement of the knob unit.

2. The vehicle air vent of claim 1, wherein the knob unit includes:
a knob body which is coupled to the rear wing and rotates the rear wing by pressing the rear wing; and
a connector which connects the knob body and the rod of the guide unit and is slidably coupled to the rear wing.

3. The vehicle air vent of claim 2, wherein the guide unit includes:
moving plates which are disposed on first and second end portions of the rod to be moved with the rod toward the side portion of the duct in conjunction with the movement of the knob unit; and
a guide plate having a shape protruding from the moving plate and connected to the front wing to rotate the front wing.

4. The vehicle air vent of claim 3, wherein the guide plate includes a rail hole of which a length is formed in a direction from the rear wing toward the front wing and which limits a rotation range of the front wing.

5. The vehicle air vent of claim 4, wherein the moving plates include:
a first moving plate which is disposed on a first end portion of the rod and stops rotation of the connector of the knob unit in a first direction; and
a second moving plate which is disposed on a second end portion of the rod and stops rotation of the connector of the knob unit in a second direction opposite to the first direction.

6. The vehicle air vent of claim 5, comprising:
at least one spacer which is disposed in the duct and slidably supports at least one of the first and second moving plates.

7. The vehicle air vent of claim 6, wherein the at least one spacer includes:
a first spacer which slidably supports the first moving plate and the guide plate; and
a second spacer which slidably supports the second moving plate.

8. The vehicle air vent of claim 6, wherein the first spacer includes:
a first accommodation groove which accommodates the first moving plate; and
a second accommodation groove which has a shape extending from the first accommodation groove and accommodates the guide plate.

9. The vehicle air vent of claim 8, wherein the front wing includes:
a first front wing including a moving protrusion movably mounted in the rail hole; and
a plurality of second front wings disposed at a first side and a second side of the first front wing and rotated in a same direction as a direction in which the first front wing is rotated.

10. The vehicle air vent of claim 9, wherein the moving protrusion is guided by the rail hole to move toward or away from the first moving plate in response that the first moving plate moves toward the side portion of the duct.

11. The vehicle air vent of claim 9, wherein the first front wing includes:
a first body including a rotary shaft pivotally coupled to the first spacer; and
a connecting plate formed in a "L" shape with the first body,
wherein the moving protrusion is formed on a distal end portion of the connecting plate.

12. The vehicle air vent of claim 2, wherein the rod is disposed on a rotation path of the connector of the knob unit.

13. The vehicle air vent of claim 2,
wherein the knob body includes a concave portion, and
wherein the connector includes a coupling blocks connected by a hook and slidably coupled to the concave portion.

14. The vehicle air vent of claim 13, wherein the hook is movably coupled to the rod.

* * * * *